US007774748B1

(12) United States Patent
Goodwin

(10) Patent No.: US 7,774,748 B1
(45) Date of Patent: Aug. 10, 2010

(54) SYSTEM AND METHOD FOR AUTOMATIC CONVERSION OF A PARTIALLY-EXPLICIT INSTRUCTION SET TO AN EXPLICIT INSTRUCTION SET

(75) Inventor: David William Goodwin, Sunnyvale, CA (US)

(73) Assignee: Tensilica, Inc., Santa Clara, CA (US)

( * ) Notice: Subject to any disclaimer, the term of this patent is extended or adjusted under 35 U.S.C. 154(b) by 1139 days.

(21) Appl. No.: 10/922,125

(22) Filed: Aug. 3, 2004

(51) Int. Cl.
*G06F 9/44* (2006.01)
(52) U.S. Cl. .................................................... 717/109
(58) Field of Classification Search ................ 717/140, 717/144; 712/24, 208–213
See application file for complete search history.

(56) References Cited

U.S. PATENT DOCUMENTS

| 5,247,625 | A  | * | 9/1993  | Yoshitake et al. ........... 712/208 |
| 5,896,518 | A  | * | 4/1999  | Yao et al. ................... 712/208 |
| 6,324,639 | B1 | * | 11/2001 | Heishi et al. ................ 712/212 |
| 6,434,690 | B1 | * | 8/2002  | Ohsuga et al. ................ 712/35 |
| 6,477,683 | B1 |   | 11/2002 | Killian et al. |
| 6,477,697 | B1 |   | 11/2002 | Killian et al. |
| 6,745,320 | B1 | * | 6/2004  | Mitsuishi .................... 712/225 |
| 6,763,452 | B1 | * | 7/2004  | Hohensee et al. ........... 712/227 |
| 6,772,106 | B1 | * | 8/2004  | Mahlke et al. ................ 703/21 |
| 6,810,476 | B2 | * | 10/2004 | McGrath et al. ............. 712/228 |
| 6,823,505 | B1 | * | 11/2004 | Dowling ..................... 717/140 |
| 7,007,271 | B2 | * | 2/2006  | Kumar et al. ................ 717/151 |
| 7,086,045 | B2 | * | 8/2006  | Park ........................... 717/151 |
| 7,103,754 | B2 | * | 9/2006  | Check et al. ................ 712/210 |
| 7,174,546 | B2 | * | 2/2007  | Koseki et al. ............... 717/157 |
| 7,181,595 | B1 | * | 2/2007  | Siska ........................... 712/24 |
| 7,181,730 | B2 | * | 2/2007  | Pitsianis et al. ............. 717/132 |
| 2004/0073773 | A1 | * | 4/2004 | Demjanenko ................ 712/7 |
| 2004/0216021 | A1 | * | 10/2004 | Matsuda et al. ............. 714/728 |
| 2006/0152511 | A1 | * | 7/2006 | Whatmough ................ 345/473 |
| 2006/0224859 | A1 | * | 10/2006 | Ohsuga et al. .............. 712/200 |

OTHER PUBLICATIONS

Aa et al. "Instruction buffering exploration for low energy VLIWs with instruction clusters", Jan. 2004, IEEE Press, pp. 824.*
Kastner et al. "Instruction generation for hybrid recofigurable systems" Oct. 2002, ACM, TODAES vol. 7 Issue 4, pp. 605- 627.*
U.S. Appl. No. 10/146,655, Wang et al.

* cited by examiner

*Primary Examiner*—Anna Deng
(74) *Attorney, Agent, or Firm*—Pillsbury Winthrop Shaw Pittman LLP

(57) ABSTRACT

The present invention is directed to a system and method for adding programmer visible features to a microprocessor by using partially-explicit ISA constructs. The system includes a language for expressing the partially-explicit ISA constructs that describe VLIW instruction formats, slots, and operations. These partially-explicit instruction set constructs are used in conjunction with prior art instruction set constructs to describe a complete instruction set. The system also includes a method for converting a partially-explicit instruction set to an explicit instruction set, which can then be used as described in prior art processor generation systems to generate fully-pipelined micro-architectural implementations in the form of synthesizable HDL, and to generate software components for extending software development tools for the microprocessor. Because the partially-explicit instruction set constructs are easier to write, modify, and maintain than prior art instruction set constructs, the invention significantly simplifies the process of describing an instruction set.

30 Claims, 3 Drawing Sheets

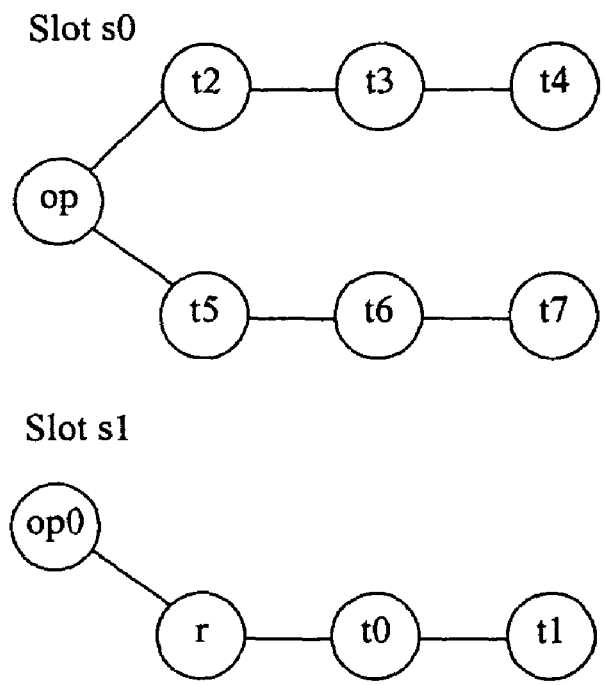
Figure 1: Interference graphs for slot s0 and slot s1.
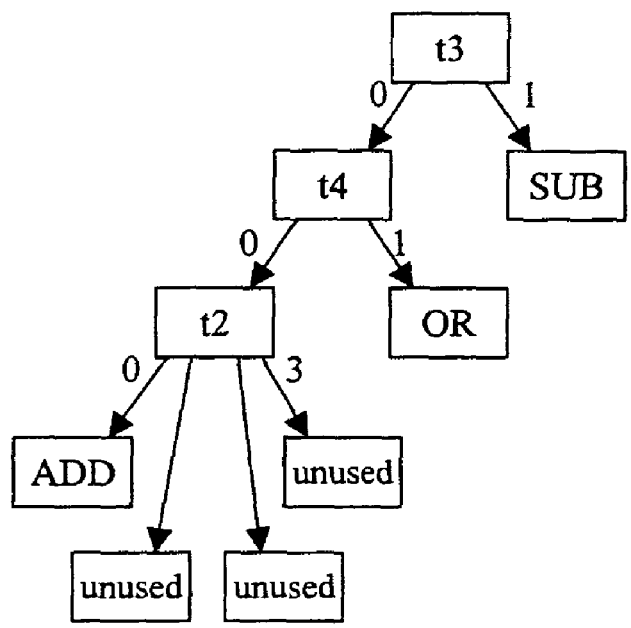
Figure 2: Final encoding/decoding tree for slot s2.

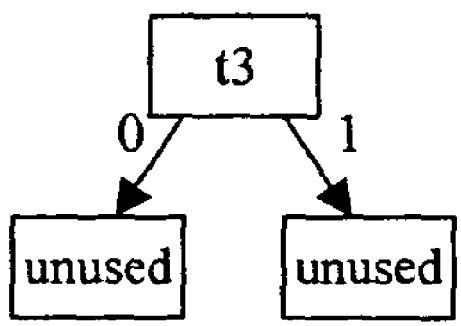
Figure 3: Initial encoding/decoding tree for slot s2.

SYSTEM AND METHOD FOR AUTOMATIC CONVERSION OF A PARTIALLY-EXPLICIT INSTRUCTION SET TO AN EXPLICIT INSTRUCTION SET

FIELD OF THE INVENTION

The present invention is directed toward digital computing systems. More particularly, it is directed to the automatic specification of portions of the programmer-visible features in digital computing systems.

BACKGROUND OF THE INVENTION

It is typically know in the art that an Instruction Set Architecture (ISA) describes the instructions, operations; register files, encoding/decoding logic, and field assignments of a processor that are made visible to the programmer. An ISA that supports a Very Long Instruction Word (VLIW) specifies one or more instruction formats. Each format can contain one or more slots which in turn contain one or more operations.

The Tensilica Instruction Extension (TIE language) described in U.S. Pat. No. 6,477,683 entitled "Automated Processor Generation System For Designing A Configurable Processor And Method For The Same" and TIE language extensions described in U.S. Pat. No. 6,477,697 entitled "Adding Complex Instruction Extensions Defined In A Standardized Language To A Microprocessor Design To Produce A Configurable Definition Of A Target Instruction Set, An HDL Description Of Circuitry Necessary To Implement The Instruction Set, And Development And Verification Tools For The Instruction Set" and TIE language extensions described in U.S. Pat. No. 7,346,881 by A. Wang et al. entitled "Method And Apparatus For Adding Advanced Instructions In An Extensible Processor Architecture", all of which are incorporated herein by reference, describe constructs that allow an ISA to be specified. The TIE constructs require that all sizes, field assignments, and encoding/decoding logic be explicitly described, and thus an ISA described using those constructs is referred to as an explicit ISA.

The Xtensa architecture contains a core set of explicitly defined ISA elements consisting of lengths, formats, slots, fields, operations, and other elements. The TIE constructs are used to extend the core Xtensa ISA with new explicitly defined lengths, formats, slots, operations, fields, etc. Extending a core ISA with explicit constructs includes the user manually performing a number of tasks that are difficult and time-consuming; such as selecting encoding/decoding logic for operations, and selecting field assignments for operations' operands. Also, changing one explicit ISA construct can require the user to rewrite many other constructs. For example, increasing the number of registers in a register file results in the size of all fields used to access the register file increase, which may require new field assignments for some or all of the fields, which may in turn require new encoding/decoding logic for some or all of the operations. To simplify the process of extending the core Xtensa ISA, there is a need in the art for a method of describing a partially-explicit ISA. A partially-explicit ISA allows some or all of the ISA elements to be described without explicitly specifying sizes, field assignments, and encoding/decoding logic.

The prior art length and format constructs require that the encoding/decoding logic be described explicitly, as shown in the following example:
length 164 64 {InstBuf[3]=1'b1}
format f64 164 {InstBuf[3:0]=1'b1000}

The prior art slot construct specifies a slot within a format, and requires that the bits of the format that compose each slot be given explicitly, as shown in the following example:
length 164 64 {InstBuf[3]=1'b1}
format f64 164 {InstBuf[3:0]=1'b1000}
slot s0 f64[32:4]
slot s1 f64[63:33]

The prior art "iclass", "opcode", "operand", "field", and reference constructs specify a new operation, as shown in the following example:
field op0 Inst[3:0]
field t Inst[7:4]
field s Inst[11:8]
field r Inst[15:12]
opcode ADD.N op0=4'b1010
operand arr r AR {AR[r]}
operand ars s AR {AR[s]}
operand art t AR {AR[t]}
iclass iclass_add {ADD.N} {out arr, in ars, in art} { }
reference ADD.N {assign arr=ars+art;}

The field construct requires that the bits of the slot composing the field be given explicitly. The opcode construct sets out that the encoding/decoding logic included to recognize the operation be given explicitly.

However, this prior art system does not address the problem of extending an existing, explicit ISA with new partially-explicit ISA elements, as occurs, for example, when adding partially-explicit ISA elements to the core Xtensa ISA. Given the ability to specify new partially-explicit ISA elements, either through the use of new TIE constructs or some other mechanism, it becomes necessary to automatically create the undefined portions of the ISA without violating the constraints imposed by the explicit ISA elements.

Certain limitations in systems that describe automatic creation of a new instruction sets include the inability to extend existing explicit ISA with a partially-explicit ISA elements.

Thus, there is need in the art for a new partially-explicit TIE construct to specify length and format that does not require encoding/decoding logic. Additionally, there is a need for a partially-explicit TIE construct to specify a slot without requiring the explicit bits that compose the slot. Furthermore, there is need in the art for a new partially-explicit TIE construct to allow an operation to be specified without requiring the corresponding field and opcode constructs to be given explicitly. In particular, there is need in the art for a system that can create an explicit ISA from a partially-explicit ISA based on the following:
the encoding/decoding logic created for partially-explicit length constructs must not conflict with the encoding/decoding logic for any explicit length constructs;
the encoding/decoding logic created for partially-explicit format constructs must not conflict with the encoding/decoding logic for any explicit format constructs;
the format bits assigned to a partially-explicit slot construct must not conflict with the format bits assigned to explicit slots within the same format; and
the encoding/decoding logic created for a partially-explicit operation must not conflict with the encoding/decoding logic of any explicit operations within a slot.

BRIEF SUMMARY OF THE INVENTION

The present invention is directed to a system and method for adding programmer visible features to a microprocessor by using partially-explicit ISA constructs. The system includes a language for expressing the partially-explicit ISA constructs that describe VLIW instruction formats, slots, and operations. These partially-explicit ISA constructs are used in conjunction with prior art ISA constructs to describe a complete ISA. The system also includes a method for converting a partially-explicit ISA to an explicit ISA, which can then be used as described in prior art processor generation systems to generate fully-pipelined micro-architectural implementations in the form of synthesizable HDL, and to generate software components for extending software development tools for the microprocessor.

The partially-explicit ISA constructs and the system for converting a partially-explicit ISA to an explicit ISA described in this invention improve the prior art systems by allowing an explicit core ISA to be extended with partially-explicit ISA constructs. Because the partially-explicit ISA constructs are easier to write, modify, and maintain than prior art ISA constructs, the invention significantly simplifies the process of describing an ISA.

BRIEF DESCRIPTION OF THE DRAWINGS

These and other objects, features, and advantages of the present invention are better understood by reading the following detailed description of an embodiment, taken in conjunction with the accompanying drawings, in which:

FIG. 1 illustrates an interference graphs for slot s0 and slot s1 according to the invention;

FIG. 2: illustrates a final encoding/decoding tree for slot s2 according to the invention;

FIG. 3: illustrates an initial encoding/decoding tree for slot s2 according to the invention;

DETAILED DESCRIPTION OF PREFERRED EMBODIMENTS

Figure 4:
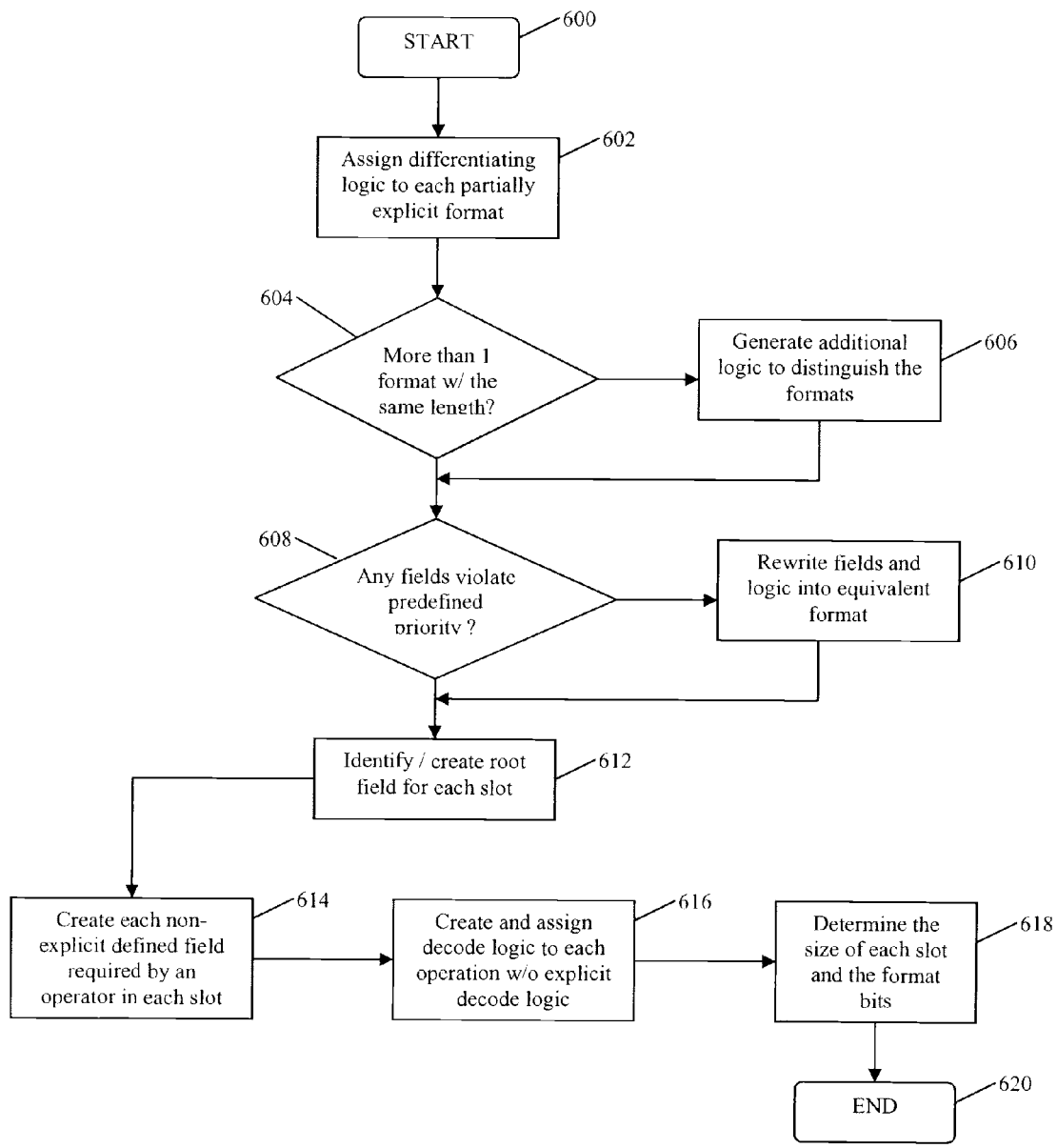
FIG. 4 is a flow chart representation of a method for converting a partially explicit instruction set to an explicit instruction set according to the invention.

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be referred to and/or omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

In general, the present invention relates to providing the ability to include a partially-explicit operation in the design of a microprocessor such as, for example, an Xtensa configurable processor from Tensilica, Inc. of Santa Clara, Calif. Generally, a partially-explicit operation describes the name, operands, and behavior of an operation without specifying the encoding/decoding logic of the operation, and without specifying the field assignment of the fields included by the operation. The invention will be described hereinbelow with reference to various implementations, which extend and improve upon the Xtensa processor and development system and the associated TIE language. However, the principles of the invention are not limited to this specific commercial embodiment, and those skilled in the art will be able to practice the invention in other processor architectures and development systems after being taught by this illustrative example.

A partially-explicit operation describes the name, operands, and behavior of an operation without specifying the encoding/decoding logic of the operation, and without specifying the field assignment of the fields included by the operation.

In one embodiment, the field, opcode, operand, iclass, and reference TIE constructs are replaced by the operation construct:

operation [o-name] [o-args] [o-inf-states] [statements]

where "o-name" is the name of the operation, "o-args" are the input and output arguments to the operation, "o-inf-states" are the input and output interfaces and states to the operation, and "statements" describe the behavior of the operation. Each of the operation's arguments specify a direction (in, out, or inout), a type (the name of a register file, table, operand, ctype, or immediate range), and a name to use to refer to the argument in the statements. Each of the operations' input and output states and interfaces specify a direction and the name of the state or interface.

The operation statements describe the circuitry used to perform the computations in a subset of the Verilog HDL for describing combinatorial circuits. For example, the following operation construct describes an ADD operation for the prior-art Xtensa processor:

operation ADD {out AR a, in AR b, in AR c} { } {assign a=b+c;}

In one embodiment, each register file, ctype, operand, interface, state, and table is specified. In one example embodiment, each immediate range is specified with the new immediate_range construct:

immediate_range ir4 [i-low] [i-high] [i-step]

where "i-low" is the low value for the immediate range, "i-high" is the high value for the immediate range, and "i-step" is the step between values in the immediate range. For example, the following immediate range represents the immediate values [−4, −2, 0, 2]:

immediate_range ir2 −4 2 2

In another embodiment, describing a partially-explicit non-VLIW ISA includes one or more operations being described using the operation construct. Describing a partially-explicit VLIW ISA requires describing, with a partially explicit TIE construct, one or more VLIW instruction formats, one or more slots, and one or more operations. An initial step in describing a partially-explicit VLIW instruction format is to specify the corresponding format size and the slots the format contains.

In one example implementation, a new version of the format construct replaces the prior art length, format, and slot constructs to specify this information as follows:

format [f-name] [f-size] [f-slot-names]

where "f-name" is a unique identifier that can be used to reference the format, "f-size" specifies the instruction size in bits, and "f-slot-names" is a list of the names of the slots contained in the format.

In one example implementation, f-size must be specified in multiples of 8 bits. For example, the following format construct specifies a VLIW format called f64 with size 64 bits containing slots s0, s1, and s2.

format f64 64 {s0, s1, s2}

In one example implementation, to specify the operations contained in a slot, the prior art field, opcode, operand, iclass, and reference constructs are replaced by the operation construct, as described above, and by the slot_opcodes construct:

slot_opcodes [s-name] [s-operation-names]

where "s-name" is the name of the slot and "s-operation-names" are the names of the operations contained in the slot. For example, the following partially-explicit constructs specify a format containing one slot. The slot contains two operations, ADD and OR_STATE.

format f64 64 {s0}
    slot_opcodes s0 {ADD, OR}
    operation ADD {out AR a, in AR b, in AR c} { } {assign a=b+c;}
    operation OR_STATE {out AR a, in AR b, in AR c} {in ASTATE}{assign a=b|c|ASTATE;}

A partially-explicit ISA can be described such that some elements of the ISA are completely defined, and other elements are undefined. Given a partially-explicit ISA, undefined portions of the ISA can be automatically created without violating the constraints imposed by the defined portions of the ISA. The information is collected about the partially-explicit ISA as described below.

For each format described in the partially-explicit ISA, the following information is included:

The name of the format, which is provided by the partially-explicit version of the format construct.
    The size of the format in bits, which is provided by the partially-explicit version of the format construct.
    The slots contained in the format, which are provided by the partially-explicit version of the format construct.

For each slot described in the partially-explicit ISA, the following information is included:

The name of the slot, which is provided by the partially-explicit version of the format construct.
    The operations in the slot, which is provided by the slot_opcodes construct.
    Optionally, the size of the slot in bits.
    Optionally, the fields defined in the slot and the bits of the slot that compose the field.

For each operation described in the partially-explicit ISA, the following information is included:

The name of the operation. In an embodiment this is provided by the operation construct.
    The fields read and written by the operation. Each field is represented by a size and a name. In an embodiment, each operation argument includes a corresponding field. The size of the field is determined from the register file, ctype, operand, table, or immediate range represented by the argument. The name of each field is generated automatically.
    Optionally, the encoding/decoding logic for the operation. In an embodiment, the prior art opcode construct is used to specify encoding/decoding logic.

Additionally the invention records the preference class for fields that are used to access a common logical resource. The invention will attempt to assign fields in the same preference class to the same bits, so that the number of logical resources is minimized. For example, all fields that are used to read a particular register file are assigned to the same preference class, so that the invention will attempt to assign those fields to the same bits, and thus minimize the number of read ports included on the register file.

In one example implementation, the following partially-explicit ISA described in TIE, format f64 64 {s0, s1}
    slot_opcodes s0 {OR, SUB}
    slot_opcodes s1 {ADD}
    field r s1[11:8]
    field op0 s1[13:12]
    operand arr r {AR[r]}
    opcode ADD op0=2'b00
    operation OR {out AR a, in AR b, in AR c} { } {assign a=b|c;}
    operation SUB {out AR a, in AR b, in AR c} { } {assign a=b−c;}
    operation ADD {out arr a, in AR b, in AR c} { } {assign a=b+c;} is represented with the following abstract representation:

format f64, size=64, slots={s0, s1}, encode/decode={ }
    slot s0, fields={ }, operations={OR, SUB}
    slot s1, fields={op0=s1[13:12], r=s1[11:8]}, operations={ADD(op0=2'b00)}
    operation ADD, out 4 r, in 4 t0, in 4 t1
    operation SUB, out 4 t2, in 4 t3, in 4 t4
    operation OR, out 4 t5, in 4 t6, in 4 t7
    preference_class r, t2, t5
    preference_class t0, t1, t3, t4, t6, t7

The partially-explicit ISA describes a single format with two slots, s0 and s1, neither of which explicitly occupies specific bits of the format. The size of the format is 64 bits. The size of the slots are not specified. Slot s0 contains the OR and SUB operations, and slot s1 contains the ADD operation. Slot s0 has no explicitly defined fields. Slot s1 has the op0 field explicitly defined to be bits 12-13 of the slot, and field r explicitly defined to be bits 8-11 of the slot. In slot s0, neither the OR nor the SUB operation has explicit encoding/decoding logic. In slot s1, the ADD operation has explicit encoding/decoding logic using the op0 field. Explicitly defined field r is used to write the AR register file, as are fields t2 and t5 (which are created to represent operation argument a for OR and SUB). Thus, fields r, t2, and t5 are assigned to the same preference class. Similarly, fields t0, t1, t3, t4, t6, and t7 are assigned to the same preference class because they are used to read the AR register file.

Based on the input described above, the invention will perform the following actions:

For each format that does not have explicit encoding/decoding logic, the invention will create unique encoding/decoding logic. For the prior art TIE system, the encoding/decoding logic will be composed of both length and format encoding/decoding logic. One skilled in the art will recognize that other systems may require only a single set of encoding/decoding logic.
    For each slot that does not have a root decoding field, as defined below, the invention will create a 1-bit field to act as the root encoding/decoding field.
    For each field included by an operation that is not explicitly defined in a slot containing that operation, the invention will create the field and assign it to bits from the slot. When creating fields for a slot, the invention will attempt to assign fields belonging to the same preference class to the same set of slot bits.
    For each operation that does not have explicit encoding/decoding logic in a slot, the invention will create unique encoding/decoding logic for the operation. To create the encoding/decoding logic, the invention will use the root encoding/decoding field, and will use fields explicitly defined in the slot and/or create new fields within the slot.

For each slot that does not have an explicit size, the invention will determine the minimum possible size for the slot.

For each slot contained in a format, if that slot is not explicitly assigned to bits from that format, the invention will select a set of bits from the format that are not assigned to another slot and that are not used by the format encoding/decoding logic, and assign them to the slot. If there are not enough bits for the slot, the invention will indicate that the partially-explicit ISA is not valid.

For example, for the partially-explicit ISA shown above, the invention could create the explicit ISA shown below. The minimum size for slot s0 was found to be 13 bits, and the minimum size of slot s1 was found to be 14 bits. The invention created fields t2, t3, t4, t5, t6, and t7 in slot s0, and fields t0 and t1 in slot s1. The preference classes caused t2 and t5, t3 and t6, and t4 and t7 to be assigned to the same set of bits in slot s0 (and so the slot includes one write port and two read ports to the AR register file). The OR and SUB operations were assigned encoding/decoding logic in slot s0 using the created op field.

format f64, size=64, slots={s0=f64[12:0], s1=f64[26:13]}, encode/decode={InstBuf[3:0]=4'b1111} slot s0, size=13, fields={t2,t5=s0[3:0], t3,t6=s0[7:4], t4,t7=s0[11:8], op=s0[12]}, operations={OR(op=1'b0), SUB(op=1'b1)} slot s1, size=14, fields={op0=s1[13:12], r=s1[11:8], t0=s0[3:0], t1=s0[7:4]}, operations={ADD(op0=2'b00)} operation ADD, out 4 r, in 4 t0, in 4 t1 operation SUB, out 4 t2, in 4 t3, in 4 t4 operation OR, out 4 t5, in 4 t6, in 4 t7 preference_class r, t2, t5 preference_class t0, t1, t3, t4, t6, t7

The first step that the invention performs when converting a partially-explicit ISA to an explicit ISA is to assign differentiating encoding/decoding logic to each partially-explicit format. In an embodiment, a format's encoding/decoding logic is composed of length encoding/decoding logic, plus additional encoding/decoding logic to differentiate formats that share the same length encoding/decoding logic. To allow the hardware to quickly determine the length of a format, the length encoding/decoding logic is limited to only four bits of the instruction buffer (InstBuf[3:0] for little-endian, and InstBuf[63:60] for big-endian). Based on the explicit portions of the ISA, some length encoding/decoding logic values may be unavailable for partially explicit formats. For example, for the prior art Xtensa architecture, length encoding/decoding values 0-7 are used to indicate a 24-bit format. Also, length encoding/decoding values 8-13 may optionally be used to indicate a 16-bit format. For each length included by partially-explicit formats, the invention selects one unused length encoding/decoding value, and assigns it to represent that length. If there are no unused length encoding/decoding values, the partially-explicit ISA is invalid.

If more than one partially-explicit format has the same length, then additional encoding/decoding logic must be generated to distinguish those formats. If there are n partially-explicit formats of a given length, the invention chooses ceil ($\log_2$ n) of the bits available to the formats that are not already used by the length encoding/decoding logic. The encoding/decoding logic for each format is specified with a unique value assigned to those bits.

The next step that the invention performs when converting a partially-explicit ISA to an explicit ISA is to identify or create a root encoding/decoding field for each slot. A root encoding/decoding field must be used by the encoding/decoding logic of each operation, and is used by the hardware as the start point when decoding operations. To do this, the invention first canonicalizes all explicitly defined fields used by any encoding/decoding logic so that they have the following properties:

The value assigned to a field used by encoding/decoding logic may not contain don't-care bit values No two fields used by encoding/decoding logic may share any slot bits If any fields violate the above properties, the invention rewrites the fields and the corresponding encoding/decoding logic into an equivalent format that satisfies the properties. These rewrites are performed in the following order. First, the invention removes any don't-care bit values from encoding/decoding logic by replacing the field assign with the don't-care value with one or more fields that represent the non-don't-care portions of the value. For example, the following example slot contains two explicitly defined fields used by encoding/decoding logic, and three operations with explicitly defined encoding/decoding logic:

slot s2, fields={op0=s2[3:0], op1=s2[1:0]}, operations={ADD(op0=4'b0000), SUB(op1=2'b1x), OR(op1=2'b01)}

The encoding/decoding logic for SUB specifies a value of one for bit 1 of field op1 (which is also bit 1 of the slot), and a don't-care value for bit 0 of field op1. The invention creates equivalent encoding/decoding logic by creating a new field, t0, consisting of only bit 1 of the slot, and assigning that field a value of one, as shown below:

slot s2, fields={op0=s2[3:0], op1=s2[1:0], t0=s2[1]}, operations={ADD(op0=4'b0000), SUB(t0=1'b1), OR(op1=2'b01)}

Next, the invention identifies all explicitly defined fields used by encoding/decoding logic that are composed of any of the same slot bits. There are two cases to consider: 1) not all of the fields' bits are the same, 2) all of the fields' bits are the same (i.e. the two fields specify the exact same slot bits). For case 1, the invention creates two new fields; one to represent the bits of the fields that do not overlap, and one to represent the bits of the fields that do overlap. All encoding/decoding logic using the original fields are rewritten to use the two newly created fields, and the original fields are removed from the slot. Continuing the s2 slot example, fields op0 and op1 both specify slot bits zero and one. Thus, the invention creates two new fields, t1=s2[1:0] to represent the bits specified by both op0 and op1, and t2=s2[3:2] to represent the bits specified by only one of op0 or op1. The operations that use op0 or op1 for encoding/decoding logic are rewritten to use t1 and t2, and op0 and op1 are removed from the slot, as shown below:

slot s2, fields={t0=s2[1], t1=s2[1:0], t2=s2[3:2]}, operations={ADD(t2=2'b00,t1=2'b00), SUB(t0=1'b1), OR(t1=2'b01)}

The invention keeps rewriting explicitly defined fields used by encoding/decoding logic until no more fields satisfy case 1. Continuing the s2 slot example, fields t0 and t1 fields are rewritten (because they are both composed of slot bit 1), resulting in the following slot s2, fields={t2=s2[3:2], t3=s2[1], t4=s2[0]}, operations={ADD(t2=2'b00,t3=1'b0,t4=1'b0), SUB (t3=1'b1), OR(t3=1'b0,t4=1'b1)}

For case 2, the invention removes one of the fields, and replaces all references to the removed field with the remaining field. The following example slot contains two explicitly defined fields used for encoding/decoding logic that are composed of identical slot bits slot s3, fields={op0=s3[1:0], op1=s3[1:0]}, operations={ADD(op0=2'b00), SUB(op1=2'b01)}

After removing the opt field and replacing references to the op1 field with the op0 field, the slot is as follows:

slot s3, fields={op0=s3[1:0]}, operations={ADD(op0=2'b00), SUB(op0=2'b01)}

After performing the transformations described above, the invention identifies or creates the root encoding/decoding field for each slot. For slots which contain one or more operations with explicitly defined encoding/decoding logic, the root encoding/decoding field is found by identifying the set of explicitly defined fields used for encoding/decoding logic that are used by all operations with explicitly defined encoding/decoding logic in the slot. The largest such field is identified as the root encoding/decoding field. If no such field is found, the partially explicit ISA is invalid because all operations with explicitly defined encoding/decoding logic must share at least one explicitly defined field. For slots which do not contain any operations with explicitly defined encoding/decoding logic, the invention creates a 1-bit field to serve as the root encoding/decoding field. When creating the 1-bit field, an embodiment of the invention chooses the least-significant slot bit that is not explicitly assigned to another field, so that slot size is minimized.

The next step the invention performs when converting a partially-explicit ISA to an explicit ISA is to create each non-explicitly defined field included by an operation in each slot containing that operation. For example, for the partially-explicit ISA containing slots s0 and s1 described above, the invention creates an op field in slot s0 to serve as the root encoding/decoding field for the slot, creates a t2, t3, t4, t5, t6, and t7 field in slot s0 for the OR and SUB operations, and creates a t0 and t1 field in slot s1 for the ADD operation. Initially, the created fields are not assigned to any slot bits, as shown below:

format f64, size=64, slots={s0=f64[12:0], s1=f64[26:13]}, encode/decode={ }
slot s0, size=13, fields={t2, t3, t4, t5, t6, t7, op}, operations={OR, SUB}
slot s1, size=14, fields={op0=s1[13:12], r=s1[11:8], t0, t1}, operations={ADD(op0=2'b00)}
operation ADD, out 4 r, in 4 t0, in 4 t1
operation SUB, out 4 t2, in 4 t3, in 4 t4
operation OR, out 4 t5, in 4 t6, in 4 t7
preference_class r, t2, t5
preference_class t0, t1, t3, t4, t6, t7

Referring now to FIG. 1, in order to assign slot bits to the created fields, an embodiment of the invention uses a modification of the prior art graph-coloring algorithm (G. Chaitin, et. al., Register Allocation Via Coloring, Computer Languages, vol. 6, pp 47-51, 1981) commonly used to perform register allocation in high-level language compilers. The invention creates an interference graph for each slot. Each interference graph contains a vertex for each field in the slot. An edge connects two vertices if the fields represented by those vertices are used by the same operation. For example, FIG. 1 shows the interference graphs for slots s0 and s1 derived from the partially-explicit ISA shown above.

Unlike prior art graph coloring algorithms, the invention's graph coloring algorithm simultaneously simplifies and colors vertices in each interference graph that represent the same field. Each vertex includes the number of colors equal to the size of the field represented by the vertex. Iterative coalescing (L. George and A. Appel, Iterated Register Coalescing, ACM Transactions on Programming Languages and Systems, pp 300-324, 1996) is used to merge interference graph vertices representing fields that belong to the same preference class.

For two fields, the corresponding vertices in each interference graph can only be merged if they do not interfere in any interference graph. Simultaneous simplification and coloring is included to ensure that two vertices are not merged unless it is allowed in every slot. During the coloring phase, an embodiment of the invention assigns bits to the created fields as each corresponding vertex is selected for coloring. For a merged vertex, all fields represented by the merged vertex are assigned the same bits in a particular slot. When assigning bits to the created fields, an embodiment of the invention chooses the least-significant slot bits that are not explicitly assigned to another field, so that slot size is minimized.

The next step the invention performs when converting a partially-explicit ISA to an explicit ISA is to create and assign encoding/decoding logic to each operation that does not have explicit encoding/decoding logic. To represent the encoding/decoding logic of the operations with explicit encoding/decoding logic, the invention builds an encoding/decoding tree for each slot. Each node in the encoding/decoding tree represents one of the following:

an explicitly defined field used by encoding/decoding logic
an operation with assigned encoding/decoding logic
a reserved encoding/decoding
an unused encoding/decoding A node representing an explicitly defined field used by encoding/decoding logic is a non-terminal node. A node representing a operation with encoding/decoding logic, a reserved encoding/decoding, or an unused encoding/decoding is a terminal node. Encoding/Decoding tree edges represent valid encoding/decoding transitions between two fields used by encoding/decoding logic, or between a field used by encoding/decoding logic and an operation, reserved encoding/decoding, or unused encoding/decoding. Each non-terminal node has $2^n$ outgoing edges, where 'n' is the bit size of the corresponding field. Each outgoing edge represents one of the possible encoding/decoding values for the node.

Referring now to FIG. 2, for the example s2 slot shown above, the invention identifies field t3 as the root encoding/decoding field because it is the only field used in the encoding/decoding logic of all three operations. FIG. 2 shows the encoding/decoding tree for slot s2. If the value of the t3 field is 1, the encoding/decoding tree indicates that the corresponding operation is SUB. If the value of the t3 field is 0, then the t4 field must be examined to continue encoding/decoding, etc.

Referring now to FIG. 3, in order to build the complete encoding/decoding tree for a slot, the invention starts with an encoding/decoding tree containing the root encoding/decoding node, a node representing the root encoding/decoding field of the slot, and nodes representing the unused encoding/decoding values of that field. For example, FIG. 3 shows the initial encoding/decoding tree for the slot s2.

The invention then expands the encoding/decoding tree by invoking the pseudo-code shown in the following pseudo-code for insert_decoding function used for encoding/decoding tree creation:

```
boolean insert_decoding (node n, operation i)
{
    if node 'n' does not represent a field used by the encoding/decoding logic of 'i' {
        for each decoding field, 'f', of 'i' not yet visited {
            node x=pushdown(n, f);
            if x==undefined
                continue;
            if insert_decoding(x, i)==false
                break;
            return true;
```

```
    }
        fail, input ISA is invalid}
}
mark that the field represented by node 'n' has been visited
    for 'i'
node k=the target node of the outgoing edge of 'n' repre-
    senting the decoding value of the corresponding decod-
    ing field in 'i';
if 'k' represents a decoded operation or a reserved decoding
    then fail, input ISA is invalid
if all fields used in the encoding/decoding logic of 'i' have
    been visited {
    if 'k' does not represent an unused decoding
        then fail, input ISA is invalid
    change 'k' to represent the encoding/decoding logic of
        'i'
    return true;
}
if insert_decoding(k, i)==false
    then fail, input ISA is invalid
return true;
}
```

Another example of a pseudo-code for insert_decoding function used for encoding/decoding tree creation is a follows:

```
node pushdown (node n, field f)
{
    if any outgoing edge of 'n' connects to a node represent-
        ing an decoded operation or a reserved decoding
        return undefined;
    for each node, 'k', connected to an outgoing edge of 'n'
    {
        if 'k' represents an unused decoding
            continue;
        if 'k' represents explicitly decoded field 'f'
            continue;
        if pushdown(k, f)==undefined
            return undefined;
    }
    for each node, 'k', connected to an outgoing edge of 'n'
    {
        if 'k' represents an unused decoding
            continue;
        if 'k' represents explicitly decoded field 'f'
            continue;
        replace 'k' with a copy of 'n'
        if 'n' has not yet been replaced,
            replace 'n' with a copy of 'k'
    }
}
```

As indicated above the invention expands the encoding/decoding tree by invoking the pseudo-code shown above on each operation with explicit encoding/decoding logic in the slot. Continuing the slot s2 example, for the operations with explicitly defined encoding/decoding logic the invention invokes insert_decoding(root encoding/decoding node, ADD), insert_decoding(root encoding/decoding node, SUB), and insert_decoding(root encoding/decoding node, OR). These invocations convert the encoding/decoding tree in FIG. 3 to the encoding/decoding tree in FIG. 2.

After the encoding/decoding tree is built, each node, 'n', representing a field is annotated with the slot bits that compose the field, as well as the slot bits that compose the fields represented by all nodes leading from the root encoding/decoding node to node 'n'. Each node representing an unused encoding/decoding is annotated with the slot bits of the parent node. The invention can optionally reserve encoding/decoding logic so that it will not be used for any partially-explicit operations. This is done by replacing an unused encoding/decoding tree node with a reserved encoding/decoding node. One example use of the reserved encoding/decoding node is to allow users to explicitly prevent the invention from using portions of the encoding/decoding tree for operation encoding/decoding logic.

Next, the invention assigns encoding/decoding logic for each operation in the slot that does not have explicitly defined encoding/decoding logic. For each operation in the slot, the invention determines the bits of the slot that are not available for fields used by encoding/decoding logic. Any bits used for fields included by the operation's operands cannot also be used for encoding/decoding logic. Each operation will have available at least the bits that compose the root encoding/decoding field, and potentially other bits as well.

Each operation is assigned encoding/decoding logic by replacing an encoding/decoding tree node representing an unused encoding/decoding with a new node representing the operation. An operation can replace an unused encoding/decoding node if the slot bits available for use by the encoding/decoding logic include all the slot bits annotating the unused encoding/decoding node. Thus, given an encoding/decoding tree, finding the encoding/decoding logic for each operation that does not have explicit encoding/decoding logic includes constructing a bipartite graph and solving the following maximum bipartite matching problem:

create a vertex $x_i$ for each operation
create a vertex $y_n$ for each encoding/decoding tree node representing an unused encoding/decoding
create an edge connecting $x_i$ to $y_n$ if operation i can replace node n If the solution to the maximum bipartite matching problem selects an edge adjacent to each $x_i$ vertex, then all operations can be assigned encoding/decoding logic. The encoding/decoding logic for each operation is determined by the unused encoding/decoding node represented by the $y_n$ vertex joined to $x_i$ by a selected edge. If the solution to the bipartite matching problem does not select an edge adjacent to each $x_i$ vertex, then the invention expands the encoding/decoding tree, as explained below, and attempts to solve the maximum bipartite matching problem again. One skilled in the art will recognize that weights can be assigned to the edges to represent some property of a particular matching. Finding a minimum cost, maximal flow for the resulting graph will yield a solution that maximizes (or minimizes) the value of the property. For example, if the edges are assigned an estimate of the hardware cost of the corresponding encoding/decoding logic, then the solution to the minimum cost, maximal flow problem will result in operation encoding/decoding logic that minimizes the overall hardware cost of the encoding/decoding logic.

To expand the encoding/decoding tree, the invention randomly selects an operation, i, that did not receive a decoding, and randomly selects one of the unused encoding/decoding nodes, n, where the operation could be assigned (that is, for operation i, the invention randomly selects one of the $y_n$ nodes joined to $x_i$). The invention chooses the least-significant slot bit from the bits available for encoding/decoding logic for operation i, excluding the slot bits annotating node n. If no such bit is available, the invention randomly selects another operation and tries again. If such a bit is available, the invention creates a new field in the slot representing the bit, and a new encoding/decoding tree node to represent the field. The new node replaces the unused encoding/decoding node n, and the invention attempts to solve the maximum bipartite matching problem again. The process of expanding the encoding/decoding tree and attempting to solve the matching problem repeats until a matching is found, or until no further expansion is possible. If a matching is found, it is used to determine the encoding/decoding logic for each operation, otherwise the partially-explicit ISA is invalid.

As the final step in converting a partially-explicit ISA to an explicit ISA, the invention determines the size of each slot and the format bits that compose each slot. The size of a slot is set so that it is just large enough to hold all the fields contained in the slot (i.e. the size of each slot is set to equal one more than the largest bit-index of any field in the slot). For each format, the total size of the slots contained in the format, plus the size of fields used for the format's encoding/decoding logic, must not exceed the format's size. If it does, the partially-explicit ISA is invalid. Otherwise, for each slot contained in a format that is not explicitly assigned to bits from that format, the invention will select a set of bits from the format that are not assigned to another slot, and assign them to the slot. One skilled in the art will recognize that there are many ways to select such bits.

In an embodiment, the invention may make multiple attempts at creating and assigning encoding/decoding logic to each operation that does not have explicit encoding/decoding logic. In each attempt, the invention uses reserved encoding/decoding nodes to limit the portions of the encoding/decoding tree which can be used for encoding/decoding logic. In one example implementation, the initial attempt is the most restrictive, allowing encoding/decoding logic to use only a small part of the encoding/decoding tree. Subsequent attempts increase the amount of the encoding/decoding tree that is available for encoding/decoding logic, until encoding/decoding logic is assigned to all operations, or until the entire encoding/decoding tree is made available for encoding/decoding logic. For example, in one example implementation targeting the prior art Xtensa architecture it is preferable that partially-explicit operations be assigned encoding/decoding logic from the CUST0 and CUST1 portions of the encoding/decoding tree. For this example implementation, the invention first reserves all portions of the encoding/decoding tree except for those corresponding to CUST0 and CUST1, and then attempts to assign encoding/decoding logic. If that fails, the invention makes another attempt that reserves less of the encoding/encoding tree (for example, an attempt that does not reserve the MAC16, CUST0, or CUST1 portions of the encoding/decoding tree). If that fails, the invention makes a final attempt without reserving any of the encoding/decoding tree. If the final attempt fails, then the partially-explicit ISA is invalid.

Referring now to FIG. 4, conversion of a partially explicit instruction set to an explicit instruction set begins at step 600. At step 602, differentiating encoding/decoding logic is assigned to each partially explicit format. At step 604, if the system determines that there are at least two formats with the same length, then at step 606 additional encode/decode logic is used to further distinguish between two formats of the same length. For example, in order to distinguish between a first format of length x and a second format of the same length x additional encode/decode logic in used. At step 608, if it is determined that any field violates the predetermined parameters or properties, as discussed above, then at step 610 the fields are rewritten, as well as the encode/decode logic, into an equivalent format that satisfies the predetermined properties. At step 612, the root field of each slot is identified. At step 614, the system creates each non-explicitly defined field that is included by an operation in the slot. At step 616, the system creates and assigns decode logic to each operation without an explicit decode logic, as discussed above. At step 618, the system determines the size of each slot and the format bits for the slot to produce the explicit instruction set from the partially explicit instruction set and the process ends at step 620.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A system comprising:
   means for identifying a partially explicit set of instructions used to design a processor;
   means for automatically generating an explicit instruction set from a partially explicit instruction set, wherein the explicit instruction set forms part of an overall set of instructions to be executed by the processor, the means for automatically generating the explicit instruction set including:
   means for receiving a description of a partially explicit instruction in the partially explicit set of instructions, the partially explicit instruction description including at least a format and an operation performed by the partially explicit instruction, the operation comprising one or more operands;
   means for receiving a description of the overall set of instructions, wherein the overall set of instructions description includes parameters that must be explicitly defined for instructions in the overall set of instructions, the parameters including at least one or more fields and consisting of one or more slots, the fields and the slots both comprising one or more bits;
   means for converting the partially explicit instruction to an explicit instruction for inclusion in the explicit instruction set based on the received description of the partially explicit instruction and the received description of the overall set of instructions, the converting means including:
   means for assigning encoding/decoding logic to the format of the partially explicit instruction;
   means for determining a number of the one or more fields that are needed for the conversion and assigning bits for each field in the explicit instruction based on a determination of what is required by each operand in a corresponding operation of the partially explicit instruction;
   means for determining a number of the one or more slots needed in the explicit instruction based on the determined one or more fields and the corresponding operation, and assigning fields and the corresponding operation to each slot;
   means for determining a size for each slot of the one or more slots of the explicit instruction and the field bits needed for the operation from the partially explicit instruction assigned to the each slot in order to generate an explicit instruction, the determined slots defining the assigned encoding/decoding logic; and
   means for generating a hardware description of the processor based on explicit descriptions of the overall set of instructions,
   wherein the means for identifying, means for automatically generating the explicit instruction set, and the means for generating the hardware description are implemented by one or more computers.

2. The system of claim 1, wherein the means for converting further comprises means for generating a format encoding/ decoding logic for a Very Long Instruction Word (VLIW) instruction format, such that the format encoding/decoding logic is unique.

3. The system of claim 1, wherein the means for converting further comprises means for generating a length portion encoding/decoding logic for the VLIW instruction format, such that the length portion encoding/decoding logic is unique.

4. The system of claim 1 wherein the means for converting further comprises means for generating encoding/decoding logic for a partially explicit operation assigned to a slot, wherein the operation encoding/decoding logic is unique with respect to and independent of encoding/decoding logic for other operation in the slot.

5. The system of claim 4 further comprising means for generating an encoding/decoding tree for a slot corresponding to the explicit encoding/decoding logic of operations in the slot.

6. The system of claim 5 wherein the operation encoding/decoding logic for the partially explicit operation is determined by solving a maximum bipartite matching problem.

7. The system of claim 5 wherein the operation encoding/decoding logic for the partially explicit operation is determined, while minimizing the cost of the operation encoding/decoding logic, by solving a minimum, maximum flow bipartite matching problem.

8. The system of claim 4 wherein a portion of the operation encoding/decoding logic is reserved portion to prevent assignment of the reserved portion to any partially-explicit operation.

9. The system of claim 5 wherein a portion of the encoding/decoding tree may be explicitly reserved to prevent operations from using the corresponding encoding/decoding logic.

10. The system of claim 4 wherein multiple attempts at assigning operation encoding/decoding logic is performed and at each attempt a different portion of the possible encoding/decoding logic is reserved.

11. The system of claim 1 wherein the converting means further comprises means for generating a plurality of fields for operands of each partially explicit operation.

12. The system of claim 11 wherein the fields for operands of each partially explicit operation and the explicitly specified fields are represented by an interference graph for each slot.

13. The system of claim 12 wherein a plurality of bits of the slot are assigned to each field using a graph coloring algorithm that simultaneously operates on the interference graphs of all slots.

14. The system of claim 13 wherein fields representing the same hardware resource are assigned to the same slots bits, if possible, so that the number of copies of the hardware resource is minimized.

15. The system of claim 1 wherein the number of format bits for the slot in a format is determined by the fields generated for the encoding/decoding logic and operands of the operations in the slot and by the explicitly specified fields within the slot.

16. The system of claim 1, wherein the partially explicit instruction set includes a VLIW such that an encoding/decoding logic is partially defined.

17. The system of claim 1, wherein the partially explicit instruction set includes at least one slot within the VLIW instruction format wherein the size of the slot and the bits of the VLIW instruction format occupied by the slot are partially defined.

18. The system of claim 1, wherein the partially explicit instruction set includes a means for specifying at least one operation wherein the encoding/decoding logic is not explicitly defined.

19. The system of claim 1, wherein the partially explicit instruction set includes a means for specifying at least one operation wherein the bits occupied by the fields required by the operation's operands and encoding/decoding logic are not explicitly defined.

20. A system according to claim 1, wherein the partially explicit instruction specifies one or more of an instruction name, instruction operand and an instruction behavior, but does not define certain of the plurality of elements.

21. A method, comprising:
receiving a description of a partially explicit instruction, the partially explicit instruction description including at least a format and an operation performed by the partially explicit instruction, the operation comprising one or more operands;
receiving a description of an explicit instruction set of a processor, wherein the explicit instruction set description includes parameters that must be explicitly defined for instructions in the explicit instruction set, the parameters including at least one or more fields and consisting of one or more slots, the fields and the slots both comprising one or more bits;
automatically converting the partially explicit instruction to an explicit instruction for inclusion in the explicit instruction set based on the received description of the partially explicit instruction and the received description of the explicit instruction, the automatically converting step including the steps of:
assigning encoding/decoding logic to the format of the partially explicit instruction;
determining a number of the one or more fields that are needed for the conversion and assigning bits for each field in the explicit instruction based on a determination of what is required by each operand in a corresponding operation of the partially explicit instruction;
determining a number of the one or more slots needed in the explicit instruction based on the determined one or more fields and the corresponding operation, and assigning fields and the corresponding operation to each slot; and
determining a size for each slot of the one or more slots of the explicit instruction and the field bits needed for the operation from the partially explicit instruction assigned to the each slot in order to generate an explicit instruction, the determined slots defining the assigned encoding/decoding logic; and
generating a hardware description of a processor that executes instructions in the explicit instruction set, the generated hardware description including the assigned encoding/decoding logic for the converted partially explicit instruction.

22. The method of claim 21, wherein the step of assigning encoding/decoding logic comprises the steps of:
determining if more than one format has the same length; and
assigning additional encoding/decoding logic to formats that share the same length in order to distinguish those formats.

23. The method of claim 22 wherein the converting step further comprises the steps of:
determining if any field violates at least one predefined property; and rewriting the field and the corresponding encoding/decoding logic into an equivalent format that satisfy the predefined property.

24. The method of claim 23, wherein the predefined property includes values assigned to encoding/decoding logic that eliminate don't-care bit values.

25. The method of claim 23, wherein the predefined property includes eliminating sharing of slot bits between any two fields used by encoding/decoding logic.

26. The method of claim 21 wherein the converting step further comprises solving maximum bipartite matching problem to determine an operation encoding/decoding logic for the partially explicit operation.

27. The method of claim 21 wherein the converting step further comprises the steps of creating an interference graph for each slot of the one or more slots, wherein each interference graph includes a vertex for each field in the slot.

28. The method of claim 21 wherein the converting step further comprises generating a graph coloring algorithm to simplify and color the vertex of each interference graph representing the same field, wherein each vertex includes the number of colors equal to the size of the field represented by the vertex.

29. A method according to claim 21, wherein the partially explicit instruction is among a plurality of partially explicit instructions that are included in the explicit instruction set of the processor.

30. A method comprising:
automatically combining a fixed instruction set with a partially defined instruction set of produce an extended instruction set, the automatically combining including:
receiving a description of a partially explicit instruction in the partially defined instruction set, the partially explicit instruction description including at least a format and an operation performed by the partially explicit instruction, the operation comprising one or more operands;
receiving a description of the fixed instruction set, wherein the fixed instruction set description includes parameters that must be explicitly defined for instructions in the fixed instruction set, the parameters including at least one or more fields and consisting of one or more slots, the fields and the slots both comprising one or more bits;
converting the partially explicit instruction to an explicit instruction for inclusion in the fixed instruction set based on the received description of the partially explicit instruction and the received description of the fixed instruction set, the converting step including the steps of:
assigning encoding/decoding logic to the format of the partially explicit instruction;
determining a number of the one or more fields that are needed for the conversion and assigning bits for each field in the explicit instruction based on a determination of what is required by each operand in a corresponding operation of the partially explicit instruction;
determining a number of the one or more slots needed in the explicit instruction based on the determined one or more fields and the corresponding operation, and assigning fields and the corresponding operation to each slot;
determining a size for each slot of the one or more slots of the explicit instruction and the field bits needed for the operation from the partially explicit instruction assigned to the each slot in order to generate an explicit instruction, the determined slots defining the assigned encoding/decoding logic; and
generating a hardware description of a processor that executes instructions in the extended instruction set.

* * * * *